United States Patent [19]

Hara

[11] Patent Number: 5,057,756
[45] Date of Patent: Oct. 15, 1991

[54] ACCELERATION/DECELERATION CONTROL APPARATUS FOR SERVO CONTROL

[75] Inventor: Ryuichi Hara, Yamanashi, Japan
[73] Assignee: Fanuc Ltd., Minamitsuru, Japan
[21] Appl. No.: 474,751
[22] PCT Filed: Jul. 24, 1989
[86] PCT No.: PCT/JP89/00738
  § 371 Date: Mar. 23, 1990
  § 102(e) Date: Mar. 23, 1990
[87] PCT Pub. No.: WO90/01187
  PCT Pub. Date: Feb. 8, 1990

[30] Foreign Application Priority Data

Jul. 24, 1988 [JP] Japan .................................. 63-186893

[51] Int. Cl.$^5$ ............................................. G05B 19/18
[52] U.S. Cl. ..................................... 318/569; 318/573; 318/636; 318/568.15
[58] Field of Search ............ 318/569, 573, 636, 568.15

[56] References Cited

U.S. PATENT DOCUMENTS 4,554,497 11/1985 Nozawa et al. ...................... 318/636
4,603,286 7/1986 Sakano .................................. 318/615
4,706,003 11/1987 Nakashima et al. ............. 318/636 X Primary Examiner—William M. Shoop, Jr.
Assistant Examiner—Saul M. Bergmann
Attorney, Agent, or Firm—Staas & Halsey

[57] ABSTRACT

An acceleration/deceleration control apparatus for servo control is provided, which is capable of securely restraining vibration of servomotors for use as drive sources for various machines.

The acceleration/deceleration control apparatus comprises acceleration/deceleration control sections as many as servomotors mounted in a machine, and each acceleration/deceleration control section includes first to third acceleration/deceleration filters each composed of a predetermined number of delay units and connected in series with one another. The first to third filters deliver outputs (Pb, Pc, Pd) to a corresponding one of the second and third filters and a servo circuit, each of the outputs being obtained by dividing the sum of stored values of the delay units of each filter and a corresponding one of a commanded speed (Pa), a first output (Pb) and a second filter output (Pc) by the sum of a value of "1" and the number of units. The discontinuity of primary and secondary derived functions (acceleration and jerk) of the first filter output (Pb), caused during the acceleration/deceleration process ($\tau$), is removed by acceleration/deceleration processes in the second and third filters.

8 Claims, 3 Drawing Sheets

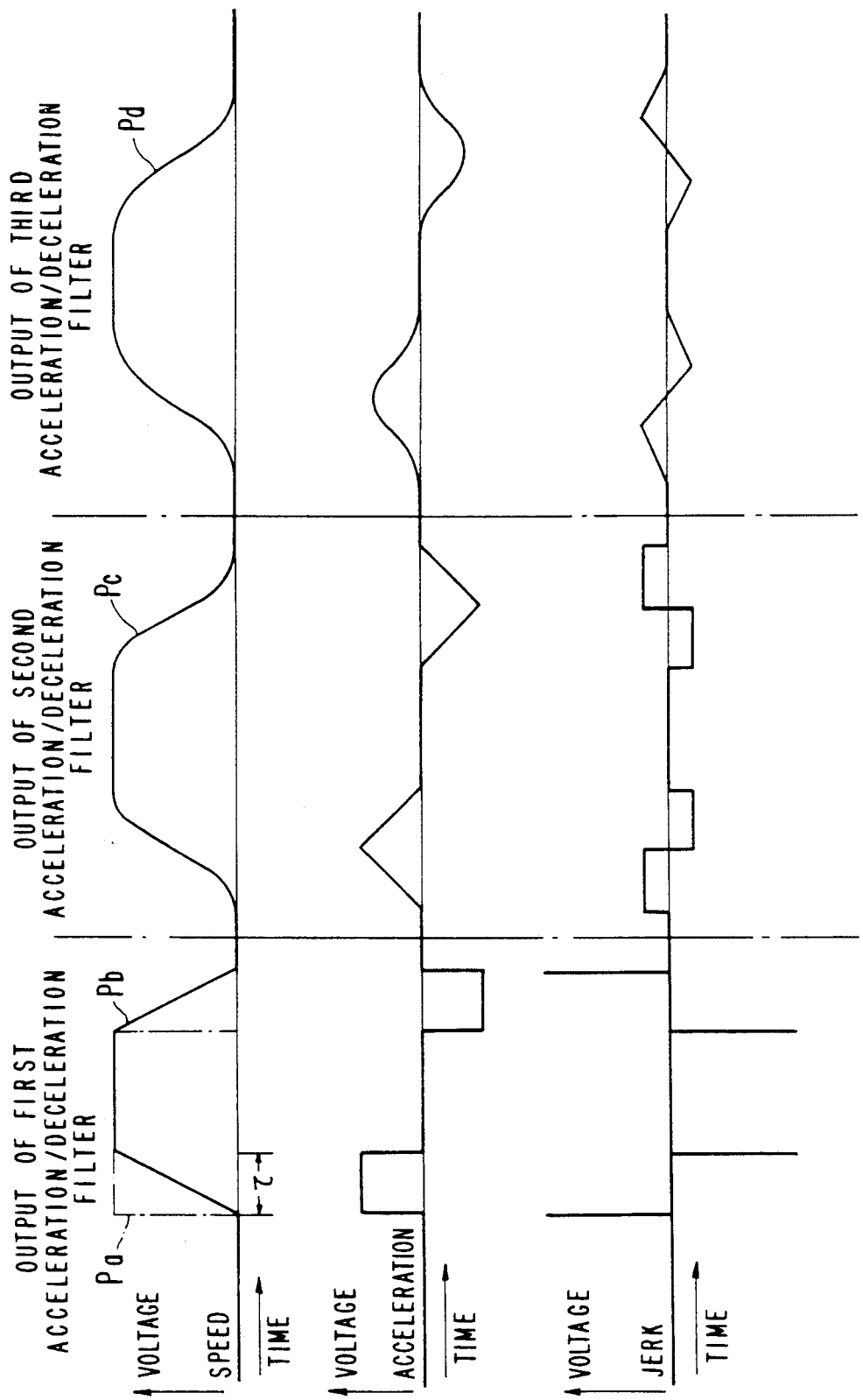

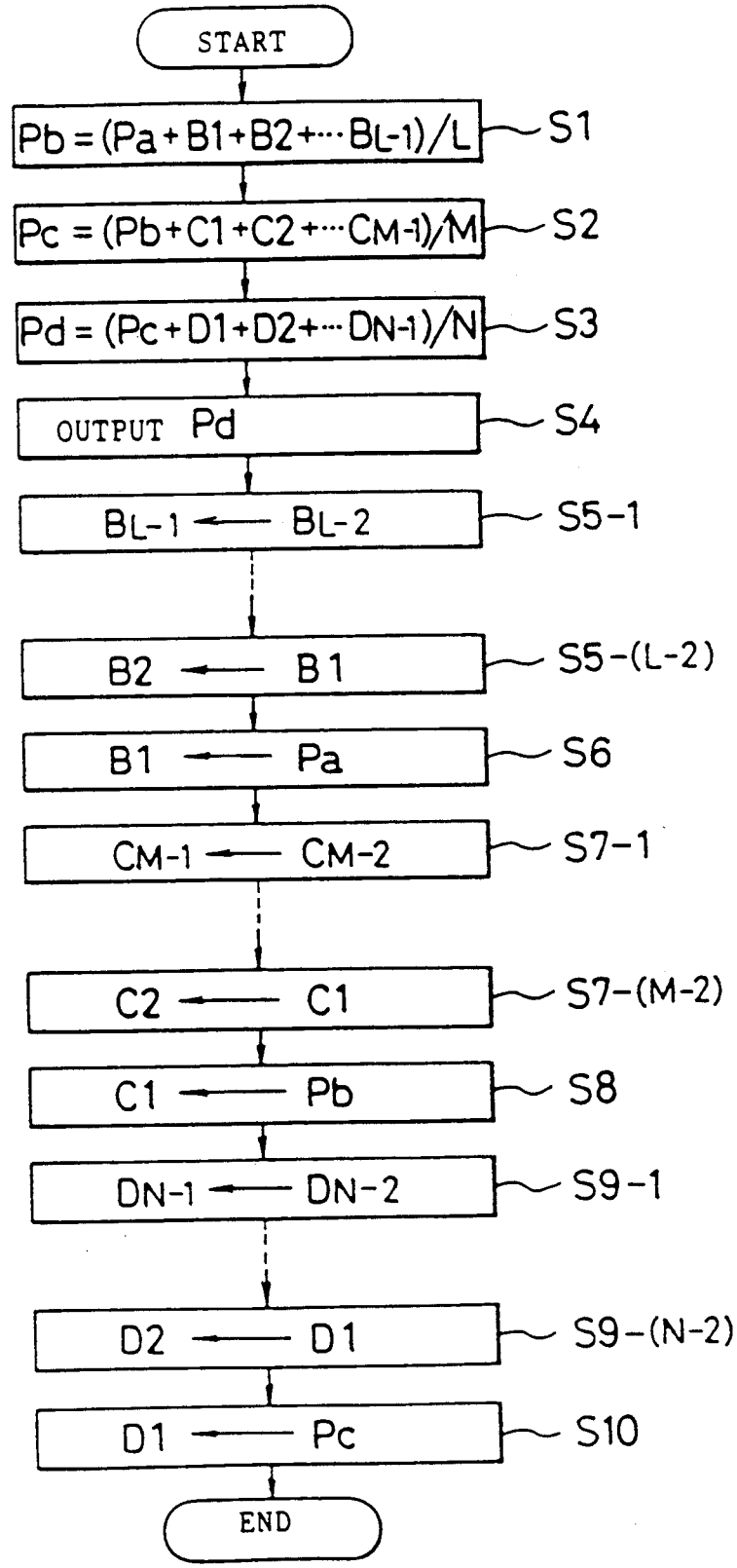

ACCELERATION/DECELERATION CONTROL APPARATUS FOR SERVO CONTROL

FIELD OF THE INVENTION

The present invention relates to an acceleration/deceleration control apparatus for servo control in NC machine tools, industrial robots, etc.

DESCRIPTION OF THE RELATED ART

In various machines such as NC machine tools, industrial robots, etc., which use servomotors as drive sources for individual axes, the drive of each servomotor is generally controlled for a required operation by means of a servo circuit for each axis which responds to a command applied through an interpolation circuit. In these machines, the servomotor is liable to produce vibration when the value of the command changes considerably, e.g., when the servomotor is started or stopped. Conventionally, therefore, production of the vibration is restrained by the so-called acceleration/deceleration control (see, Japanese Provisional Patent Application No. 59-168513), where a pre- or post-interpolation speed command is increased or decreased from a pre-change value to a post-change value in accordance with a predetermined function, by using one or two acceleration/deceleration filters provided ahead of the interpolation circuit or between the interpolation circuit and the servo circuit. According to the conventional acceleration/deceleration control, however, the vibration sometimes cannot be fully restrained.

SUMMARY OF THE INVENTION

The object of the present invention is to provide an acceleration/deceleration control apparatus for servo control, capable of securely restraining vibration of servomotors mounted in various machines, such as NC machine tools, industrial robots, etc.

In order to achieve the above object, according to the present invention, an acceleration/deceleration control apparatus for servo control comprises at least one acceleration/deceleration control section, including first acceleration/deceleration control means for executing a first acceleration/deceleration process for a supplied servo control command signal, second acceleration/deceleration control means for executing a second acceleration/deceleration process for an output of the first acceleration/deceleration control means, and third acceleration/deceleration control means for executing a third acceleration/deceleration process for an output of the second acceleration/deceleration control means.

As described above, according to the acceleration/deceleration control apparatus of the present invention, the output obtained by the first acceleration/deceleration process for the supplied servo control command signal, e.g., a speed command, is subjected to the second acceleration/deceleration process. Further, the resultant output is subjected to the third acceleration/deceleration. Thus, the continuity of primary and secondary derived functions (acceleration and jerk when the speed command is supplied) of the servo control command signal with respect to the time can be secured. Consequently, when the command value of the servo control command signal changes, the command signal can be smoothly changed to a post-change commanded value, so that vibration of servomotors can be securely restrained.

BRIEF DESCRIPTION OF THE DRAWINGS

FIG. 3 is a diagram showing time-dependent changes of the respective outputs (speeds) of first to third acceleration/deceleration filters of the acceleration/deceleration control section of FIG. 1, along with time-dependent changes of primary and secondary derived functions (acceleration and jerk) of the outputs; and FIG. 4 is a flow chart of control program executed by an acceleration/deceleration control apparatus according to a second embodiment of the present invention.

DESCRIPTION OF THE PREFERRED EMBODIMENTS

Figure 1:
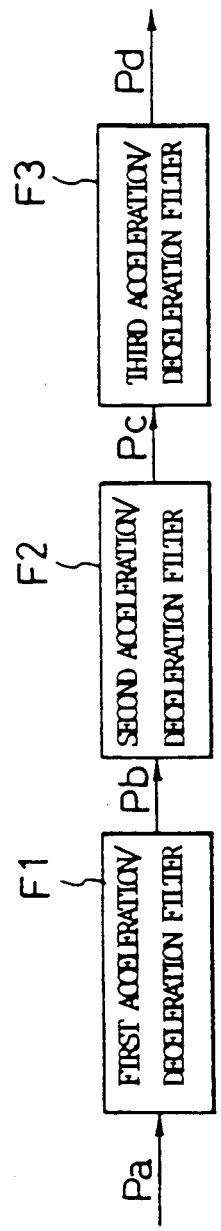
FIG. 1 is a schematic block diagram showing an acceleration/deceleration control section of an acceleration/deceleration control apparatus according to a first embodiment of the present invention, the control section corresponding to one control axis of a machine used with the apparatus.

An acceleration/deceleration control apparatus according to a first embodiment of the present invention constitutes part of a control apparatus (not shown) for controlling the operation of a machine (not shown), e.g., an NC machine tool or industrial robot. The acceleration/deceleration control apparatus comprises acceleration/deceleration control sections for as many servomotors for various axes of the machine and constructed in the same manner as one another. FIG. 1 shows only one acceleration/deceleration control section which corresponds to one axis (servomotor) of the machine.

The acceleration/deceleration control section samples, at intervals of a predetermined period T, a commanded value (commanded speed) Pa of a postinterpolation speed command supplied from a command generator of the control apparatus, e.g., a pulse delivery section (not shown), through an interpolation circuit (not shown) of the control apparatus, executes three stages of acceleration/deceleration processing for the command, and supplies a servo circuit (not shown) with the resultant commanded speed Pd after acceleration/deceleration processing. To this end, the acceleration/deceleration control section includes a first acceleration/deceleration filter F1 for an acceleration/deceleration process for the commanded speed Pa, a second acceleration/deceleration filter F2 for an acceleration/deceleration process for an output Pb of the filter F1, and a third acceleration/deceleration filter F3 for an acceleration/deceleration process for an output Pc of the filter F2.

Figure 2:
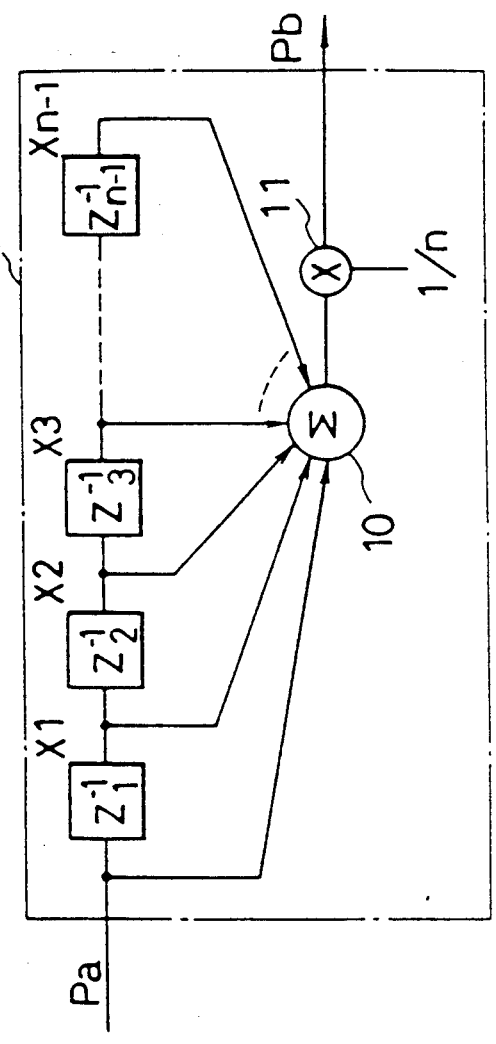
FIG. 2 is a block diagram of a first acceleration/deceleration filter shown in FIG. 1.

As shown in FIG. 2, the first acceleration/deceleration filter F1 includes $(n-1)$ number of delay units $Z^{-1}1$ to $Z^{-1}(n-1)$ (e.g., four in number) connected in series with one another, an adder 10 having n number of input terminals connected individually to the input side of the first delay unit $Z^{-1}1$ and the respective output sides of their corresponding delay units $Z^{-1}i$ ($i=1, 2, \ldots, n-1$), and a multiplier 11 connected to the output side of the adder. The input side of the first delay unit $Z^{-1}$ and the output side of the $(n-1)$th delay unit $Z^{-1}(n-1)$ are connected to the output side of the interpolation circuit and the input side of the servo circuit, respectively. The first acceleration/deceleration filter F1 is arranged to shift a value stored in the delay unit $Z^{-1}i$ to the next-stage delay unit, add, in the adder 10, the commanded speed Pa to a stored value Xi in each delay unit $Z^{-1}i$, and multiply, in the multiplier 11, the resultant sum by a value "1/n (e.g., 1/5)" so as to deliver a product Pb given by the following equation (1), each time the first filter F1 samples the commanded speed Pa at intervals of the predetermined period T (e.g., 8 msec). Here, a required processing time (hereinafter referred to as acceleration/deceleration time) $\tau$ from the start of the acceleration/deceleration processing to the end of the same in the first acceleration/deceleration filter F1 is equal to the product nT (e.g., 40 msec) of the parameter n and the sampling period T. In other words, the acceleration/deceleration time $\tau$ can be set arbitrarily by providing a required number of delay units. Also, the delay unit $Z^{-1}i$ is so arranged that its stored value is initialized to be "0."

$$Pb = (Pa + \Sigma Xi)/n \qquad (1)$$

where $\Sigma Xi$ is the sum of $X1, X2, \ldots, X(n-1)$.

The second and third acceleration/deceleration filters F2 and F3 are constructed in the same manner as the first acceleration/deceleration filter F1, and hence illustrations and explanations thereof will be omitted herein. As distinct from the first acceleration/deceleration filter F1 which receives the commanded speed Pa and delivers the product Pb, the second acceleration/deceleration filter F2 receives the value Pb and delivers the value Pc, and the third acceleration/deceleration filter F3 receives the value Pc and delivers the value Pd. Thus, the second and third acceleration/deceleration filter outputs Pc and Pd are given by the following equations (2) and (3).

$$Pc = (Pb + \Sigma Xi)/n \qquad (2)$$

$$Pd = (Pc + \Sigma Xi)/n \qquad (3)$$

In the following, operation of the acceleration/deceleration control section of the thus constructed acceleration/deceleration control apparatus, corresponding to one axis of the machine on which the control apparatus is mounted, will be explained.

Here, let it be assumed that the value of the stepped commanded speed Pa (indicated by one-doted line in FIG. 3), applied from the interpolation circuit to the acceleration/deceleration control section, is "100." Let us also assume that the first to third filters F1 to F3 are each formed of the four delay units $Z^{-1}i$, and the sampling time T and the acceleration/deceleration time $\tau$ in each filter are 8 msec and 40 msec, respectively.

Before the commanded speed Pa is supplied (Pa=0), the stored values Xi of the respective delay units $Z^{-1}i$ of the first to third filters F1 to F3 of the acceleration/deceleration control section are initialized to be "0." In this case, as apparent from equations (1) to (3), the respective outputs Pb to Pd of the first to third filters F1 to F3 are "0."

An acceleration process is entered when the commanded speed Pa is inputted. More specifically, in a sampling period (first sampling cycle) immediately after the input of the commanded speed, the commanded speed Pa (=100) is applied to the input side of the first delay unit $Z^{-1}1$ of the first filter F1, while the stored values Xi of the four delay units $Z^{-1}i$ still remain at "0." Accordingly, the output Pb of the value "20" is delivered from the first filter F1. In a second sampling cycle, the commanded speed Pa is applied to the input side of the first delay unit $Z^{-1}1$, and the commanded speed P applied in the preceding cycle is stored in this unit. As a result, the output Pb of the value "40" is delivered from the filter F1. In third to fifth sampling cycles, moreover, the filter output Pb gradually increases to "60," "80," and "100." Thereafter, the output Pb of the first filter F1 is kept maintained at the value "100" as long as the commanded speed Pa (=100) is applied to this filter.

During the application of the commanded speed, an acceleration process for the output Pb of the first filter F1 is executed in the second acceleration/deceleration filter F2 in the same manner as the acceleration process in the filter F1. In the third acceleration/deceleration filter F3, moreover, an acceleration process for the output Pc of the second filter F2 is executed in like manner.

Subsequently, when the application of the commanded speed Pa is halted, a deceleration process is entered. More specifically, in the sampling period immediately after the halt of the application of the commanded speed, the application of the commanded speed Pa to the first acceleration/deceleration filter F1 is halted, while the value "100" still remains stored in the respective delay units $Z^{-1}i$ of this filter. Thus, the first filter output Pb in the sampling period immediately after the halt of the supply of the commanded speed Pa is "80." Thereafter, the filter output gradually decreases to "60," "40," "20," and "0."

When the application of the commanded speed is halted in the aforesaid manner, a deceleration process for the output Pb of the first filter F1 is executed in the second acceleration/deceleration filter F2, in the same manner as the aforesaid deceleration process in the filter F1. In the third acceleration/deceleration filter F3, moreover, a deceleration process for the output Pc of the second filter F2 is executed in like manner.

Time-dependent changes of the filter outputs Pb, Pc, and Pd, during the period between the start of the application of the commanded speed Pa and the end of the deceleration process in each filter, are shown in the left-hand, central, and right-hand portions of FIG. 3, respectively.

Immediately before and after the supply of the commanded speed Pa, the output (speed) Pb of the first acceleration/deceleration filter F1, the rate of change of the filter output Pb (hereinafter referred to as acceleration), and the change of rate of the acceleration (hereinafter referred to as jerk) vary with the lapse of time, as shown in the left-hand portion of FIG. 3 and in Table 1 below, respectively. It is noted, in association with the first filter F1, that the acceleration changes stepwise from "0" to "20" at the start of the application of the commanded speed Pa and from "20" to "0" at the end of the acceleration process. Also, it is noted that the jerk impulsively changes at the start of the application of the commanded speed and at the end of the acceleration process, and is thus discontinuous.

In association with the first filter F1, moreover, the acceleration and jerk change stepwise and impulsively (not shown in Table 1), respectively, at the start of the application of the commanded speed and at the end of the deceleration process, respectively, and are discontinuous at these points of time (see, FIG. 3).

TABLE 1

| Period | Pa | Pb | Acceleration | Jerk |
|---|---|---|---|---|
| 0T | 0 | 0 | 0 | 0 |

TABLE 1-continued

| Period | Pa | Pb | Acceleration | Jerk |
|---|---|---|---|---|
| 1T | 100 | 20 | 20 | 20 |
| 2T | 100 | 40 | 20 | 0 |
| 3T | 100 | 60 | 20 | 0 |
| 4T | 100 | 80 | 20 | 0 |
| 5T | 100 | 100 | 20 | 0 |
| 6T | 100 | 100 | 0 | −20 |

As shown in the central portion of FIG. 3 and in Table 2 below, however, the stepwise change of the rate of change of the first filter output Pb (acceleration) and the impulsive change of the jerk are respectively relaxed by means of the second acceleration/deceleration filter F2 which follows the first acceleration/deceleration filter F1. In association with the second acceleration/deceleration filter F2, however, the changing direction of the acceleration suddenly changes in the course of the acceleration and deceleration processes performed by the filter F2, as seen from FIG. 3 and Table 2. Accompanying the aforesaid change, the jerk changes stepwise during the acceleration and deceleration processes performed by the filter F2. In other words, the jerk still has discontinuity in association with the filter F2.

As shown in the right-hand portion of FIG. 3 and in Table 3, however, the sudden change of the changing direction of the acceleration and the stepwise change (discontinuity) of the jerk associated with the filter F2 are removed by means of the third acceleration/deceleration filter F3 which follows the second acceleration/deceleration filter F2.

TABLE 2

| Period | Pb | Pc | Acceleration | Jerk |
|---|---|---|---|---|
| 0T | 0 | 0 | 0 | 0 |
| 1T | 20 | 4 | 4 | 4 |
| 2T | 40 | 12 | 8 | 4 |
| 3T | 60 | 24 | 12 | 4 |
| 4T | 80 | 40 | 16 | 4 |
| 5T | 100 | 60 | 20 | 4 |
| 6T | 100 | 76 | 16 | −4 |
| 7T | 100 | 88 | 12 | −4 |
| 8T | 100 | 96 | 8 | −4 |
| 9T | 100 | 100 | 4 | −4 |
| 10T | 100 | 100 | 0 | −4 |
| 11T | 100 | 100 | 0 | 0 |

Then, the output Pd of the third acceleration/deceleration filter F3 is supplied as a commanded speed to the servo circuit of the control apparatus. As described above, a primary derived function of the filter output Pd, that is, the rate of change of the output Pd (acceleration), never suddenly shifts from an incremental change to a decremental change, or from a decremental change to an incremental change, so that a secondary derived function (jerk) of the filter output Pd changes continuously. In other words, the filter output Pd changes very smoothly during the acceleration/deceleration processing. As a result, even when the value of the speed command supplied from the interpolation circuit changes considerably, e.g., even when the servomotor is started or stopped, the servomotor can be smoothly driven in accordance with the smoothly changing filter output Pd (commanded speed), and the servomotor and the machine or robot equipped with the servomotor are free of vibration.

TABLE 3

| Period | Pc | Pd | Acceleration | Jerk |
|---|---|---|---|---|
| 0T | 0 | 0 | 0 | 0 |
| 1T | 4 | 0.8 | 0.8 | 0.8 |
| 2T | 12 | 3.2 | 2.4 | 1.6 |
| 3T | 24 | 8 | 4.8 | 2.4 |
| 4T | 40 | 16 | 8 | 3.2 |
| 5T | 60 | 28 | 12 | 4 |
| 6T | 76 | 42.4 | 14.4 | 2.4 |
| 7T | 88 | 57.6 | 15.2 | 0.8 |
| 8T | 96 | 72 | 14.4 | −0.8 |
| 9T | 100 | 84 | 12 | −2.4 |
| 10T | 100 | 92 | 8 | −4 |
| 11T | 100 | 96.8 | 4.8 | −3.2 |
| 12T | 100 | 99.2 | 2.4 | −2.4 |
| 13T | 100 | 100 | 0.8 | −1.6 |
| 14T | 100 | 100 | 0 | −0.8 |
| 15T | 100 | 100 | 0 | 0 |

In the following, an acceleration/deceleration control apparatus according to a second embodiment of the present invention will be explained.

This acceleration/deceleration control apparatus, which utilizes, for example, a conventional numerical control unit accommodating therein a computer, comprises first to third register groups arranged in predetermined address regions of a memory associated with a microprocessor of the numerical control unit. These register groups correspond to the delay unit $Z^{-1}i$ of the first to third acceleration/deceleration filters F1 to F3, respectively, shown in FIGS. 1 and 2. The acceleration/deceleration control apparatus is arranged to execute acceleration/deceleration control process of FIG. 4 at intervals of a predetermined period T. The numbers $L-1$, $M-1$, and $N-1$ of registers, which constitute each register group, are set so as to establish relations $L=\tau1/T$, $M=\tau2/T$, and $N=\tau3/T$, on the basis of acceleration/deceleration times $\tau1$ to $\tau3$ in the register groups and the control execution period T.

When the commanded speed Pa is given, as shown in FIG. 4, the microprocessor adds the commanded speed Pa and stored values $B_1$ to $B_{L-1}$ of the individual registers of the first register group, and divides the resultant sum by the value L (Step S1). The resulting quotient corresponds to the output Pb of the first acceleration/deceleration filter F1 in the foregoing embodiment. Subsequently, a value, obtained by adding stored values $C_1$ to $C_{M-1}$ of the individual registers of the second register group to the value Pb, is divided by the value M, whereby the value corresponding to the output Pc of the second filter F2 is obtained (Step S2). Further, stored values $D_1$ to $D_{N-1}$ of the individual registers of the third register group are added to the value Pc, and the resulting sum is divided by the value N to obtain the value corresponding to the output Pd of the third filter F3 (Step S3). Then, the value Pd is delivered to the servo circuit (Step S4).

Thereafter, the microprocessor transfers stored values $B_{L-1}$ to $B_{L-2}$ of the $(L-2)$th to first registers of the first register group to the $(L-1)$th to second registers, thereby causing the same to store the transferred values (Steps S5-1 to S5-$(L-2)$), and stores the commanded speed Pa in the first register (Step S6). Also, the microprocessor transfers stored values $C_{M-2}$ to $C_{M-1}$ of the $(M-2)$th to first registers of the second register group to the $(L-1)$th to second registers, thereby causing the same to store the transferred values (Steps S7-1 to S7-$(M-2)$), and stores the first register group output Pb in the first register (Step S8). Furthermore, the microprocessor transfers stored values $D_{N-1}$ to $D_{N-2}$ of the (N−2)th to first registers of the third register group to the (N−1)th to second registers, thereby causing the same to store the transferred values (Steps S9-1 to S9-(N−2)), and stores the second register group output Pc in the first register (Step S10). Thereupon, the acceleration/deceleration control process for one control period is finished. Thereafter, the aforesaid process is repeatedly executed at intervals of the predetermined period T. Consequently, as in the case of the foregoing embodiment, the discontinuity can be removed from the acceleration and the jerk to obtain a smoothly changing commanded speed.

I claim:

1. An acceleration/deceleration control apparatus for servo control, comprising:
   at least one acceleration/deceleration control section, including:
   first acceleration/deceleration control means for receiving a servo control command signal, for executing a first acceleration/deceleration process using the servo control command signal and for providing a first output based on the first acceleration/deceleration process;
   second acceleration/deceleration control means for executing a second acceleration/deceleration process using the first output and for providing a second output based on the second acceleration/deceleration process; and
   third acceleration/deceleration control means for executing a third acceleration/deceleration process using the second output and for providing a third output based on the third acceleration/deceleration process.

2. An acceleration/deceleration control apparatus for servo control according to claim 1, wherein said servo control command signal includes a speed command.

3. An acceleration/deceleration control apparatus for servo control according to claim 1, wherein the servo control command signal has a value; and wherein
   said first acceleration/deceleration control means includes means for delaying the servo control command signal, said control means executing the first acceleration/deceleration process in accordance with the servo control command signal and the delayed servo control command signal, for receiving a commanded value and for changing the value of the servo control command signal to the commanded value.

4. An acceleration/deceleration control apparatus for servo control according to claim 3, wherein said second acceleration/deceleration control means includes means for delaying the first output, said control means executing said second acceleration/deceleration process in accordance with time discontinuity of the servo control command signal.

5. An acceleration/deceleration control apparatus for servo control according to claim 4, wherein said third acceleration/deceleration control means includes means for delaying the second output, said control means executing said third acceleration/deceleration process in accordance with the second output and the delayed second output and for removing time discontinuity of the servo control command signal.

6. An acceleration/deceleration control apparatus for servo control and for reducing vibration of a servomotor, comprising:
   means for receiving a servo control signal including a speed command;
   means for storing a plurality of stored values;
   product means for determining a product based upon the servo control signal and the plurality of stored values; and
   means for providing the product to the servomotor.

7. An acceleration/deceleration control apparatus as claimed in claim 6, wherein said product means comprises:
   delay means for storing a predetermined value, for shifting the predetermined value and for providing a plurality of shifted values;
   adder means for receiving the plurality of shifted values and for providing a summation output based on the plurality of shifted values and the predetermined value; and
   multiplier means for storing a second predetermined value, for receiving the summation output and for providing the product based upon the summation output and the second predetermined value.

8. An acceleration/deceleration control apparatus as claimed in claim 7, wherein said product means further comprises:
   means for executing $P_b = (Pa + \Sigma X_i)/N$ where $P_b$ is the product, $Pa$ is the speed command, $X_i$ is the plurality of shifted values and N is a number of the plurality of shifted values.

* * * * *

UNITED STATES PATENT AND TRADEMARK OFFICE
CERTIFICATE OF CORRECTION

PATENT NO. : 5,057,756

DATED : October 15, 1991

INVENTOR(S) : RYUICHI HARA

It is certified that error appears in the above-identified patent and that said Letters Patent is hereby corrected as shown below:

Title Page [30] "Jul. 24, 1988" should be --Jul. 28, 1988--.

Signed and Sealed this

Sixteenth Day of March, 1993

*Attest:*

STEPHEN G. KUNIN

*Attesting Officer*     *Acting Commissioner of Patents and Trademarks*